US012680840B2

(12) United States Patent (10) Patent No.: US 12,680,840 B2
Ono (45) Date of Patent: Jul. 14, 2026

(54) OPTICAL FIBER SENSING DEVICE AND METHOD

(71) Applicant: NTT, Inc., Tokyo (JP)

(72) Inventor: Shingo Ono, Musashino (JP)

(73) Assignee: NTT, Inc., Tokyo (JP)

( * ) Notice: Subject to any disclaimer, the term of this patent is extended or adjusted under 35 U.S.C. 154(b) by 329 days.

(21) Appl. No.: 18/689,685

(22) PCT Filed: Sep. 21, 2021

(86) PCT No.: PCT/JP2021/034518
§ 371 (c)(1),
(2) Date: Mar. 6, 2024

(87) PCT Pub. No.: WO2023/047449
PCT Pub. Date: Mar. 30, 2023

(65) Prior Publication Data
US 2025/0003775 A1 Jan. 2, 2025

(51) Int. Cl.
*G01D 5/353* (2006.01)
*G01K 11/32* (2021.01)
(52) U.S. Cl.
CPC ......... *G01D 5/35329* (2013.01); *G01K 11/32* (2013.01)
(58) Field of Classification Search
CPC ...... G01M 11/31; G01M 11/00; G01M 11/02; G01N 21/17
USPC ....... 356/73.1, 479, 491, 487, 495, 357, 477
See application file for complete search history.

(56) References Cited

U.S. PATENT DOCUMENTS

| | | | | | |
|---|---|---|---|---|---|
| 5,321,501 | A | * | 6/1994 | Swanson | G01B 9/02019 356/73.1 |
| 5,596,409 | A | * | 1/1997 | Marcus | G01B 9/02009 356/479 |
| 5,757,485 | A | * | 5/1998 | Marcus | H04N 23/54 356/497 |

(Continued)

OTHER PUBLICATIONS

J. L. Brooks, R. H. Wentworth, R. C. Youngquist, M. Tur, B. Y. Kim, and H. J. Shaw, "Coherence Multiplexing of Fiber-Optic Interferometric Sensors", J. Lightw. Technol., vol. LT-3, No. 5, pp. 1062-1072, 1985.

*Primary Examiner* — Isiaka O Akanbi
(74) *Attorney, Agent, or Firm* — Harness, Dickey & Pierce, PLC

(57) ABSTRACT

According to the present disclosure, there is provided an optical fiber sensing device including: a reference interferometer for producing a predetermined difference in propagation delay time in continuous light; a sensor interferometer including a plurality of Mach-Zehnder interferometers having unilateral optical paths functioning as sensor units; and a signal processing unit for performing signal processing by using a light reception signal I(t) obtained by receiving light transmitting through the sensor interferometer and a reference signal $I_{ref\text{-}1}(t)$ obtained by receiving light transmitting through the reference interferometer, in which the signal processing unit calculates a cross-correlation $R_j$ between the light reception signal I(t) and the reference signal $I_{ref\text{-}j}(t)$, and detects a change in the j-th sensor unit by using a change in the cross-correlation $R_j$.

8 Claims, 4 Drawing Sheets

[1]

$$X_3(t)=X_2(t)+X_1(t-\tau_{ref})$$

$$X_2(t)=X_1(t)+X_1(t-\tau_{ref})$$

$$X_1(t)$$

PHASE $\tau_{ref}$  $2\tau_{ref}$

TIME

(56)     References Cited

U.S. PATENT DOCUMENTS

| | | | |
|---|---|---|---|
| 7,508,524 B2 * | 3/2009 | Mahadevan-Jansen | ..................... G01B 9/0203 356/73 |
| 8,379,945 B2 * | 2/2013 | Hirota | .................. A61B 5/0066 382/128 |
| 2003/0086093 A1 * | 5/2003 | Bush | .................. G01B 9/02007 356/479 |
| 2006/0274318 A1 * | 12/2006 | Jensen | ................. G01M 11/332 356/477 |
| 2009/0262337 A1 * | 10/2009 | Nicholson | ............ G01M 11/331 356/73.1 |
| 2010/0118292 A1 * | 5/2010 | Park | ................... G01B 9/02028 356/482 |
| 2013/0229662 A1 * | 9/2013 | Ogawa | ................. G01M 11/335 356/453 |
| 2024/0353289 A1 * | 10/2024 | Ono | ........................ G01M 11/00 |
| 2024/0385078 A1 * | 11/2024 | Ono | ........................ G01M 11/31 |

* cited by examiner

START

OPTICAL INTERFERENCE SIGNAL ACQUISITION STEP — S11

ACQUIRE INTERFERENCE SIGNAL I(t) OF SENSOR INTERFEROMETER AND REFERENCE SIGNAL $I_{ref-1}$(t) OF REFERENCE INTERFEROMETER

REFERENCE SIGNAL PHASE CALCULATION STEP — S12

CALCULATE PHASE $X_1$(t) OF REFERENCE SIGNAL BY FOLLOWING EXPRESSION USING $I_{ref-1}$(t)

$$X_1(t) = \tan^{-1} \frac{H[I_{ref-1}(t)]}{I_{ref-1}(t)}$$

(Here, H[$I_{ref-1}$(t)] IS HILBERT TRANSFORM OF $I_{ref-1}$(t))

PHASE COUPLING STEP — S13

CALCULATE PHASE $X_{Mj}$(t) BY FOLLOWING EXPRESSION USING $X_1$(t)

$$X_{M_j}(t) = \begin{cases} X_1(t) & (M_j = 1) \\ X_1(t) + \sum_{k=1}^{M_j-1} X_1(t - k\tau_{ref}) & (M_j > 1) \end{cases}$$

(M IS NATURAL NUMBER, AND $\tau_{ref}$ IS DIFFERENCE IN PROPAGATION DELAY TIME BETWEEN OPTICAL PATHS OF REFERENCE INTERFEROMETER)

PSEUDO SIGNAL GENERATION STEP — S14

GENERATE PSEUDO SIGNAL $I_{ref-Mj}$(t) BY FOLLOWING EXPRESSION USING $X_{Mj}$(t)

$$I_{ref-M_j}(t) = \cos X_{M_j}(t)$$

CROSS-CORRELATION STEP — S15

CALCULATE CROSS-CORRELATION $R_{Mj}$ BETWEEN I(t) AND $I_{ref-Mj}$(t) BY FOLLOWING EXPRESSION

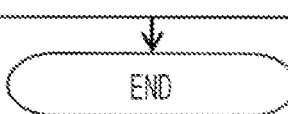

$$R_{M_j} = \int I(t) I_{ref-M_j}(t)\, dt$$

END

[4]

OPTICAL FIBER SENSING DEVICE AND METHOD

CROSS-REFERENCE TO RELATED APPLICATIONS

This application is a 371 U.S. National Phase of International Application No. PCT/JP2021/034518, filed on Sep. 21, 2021. The entire disclosure of the above application is incorporated herein by reference.

TECHNICAL FIELD

The present disclosure relates to a field of optical fiber sensing techniques.

BACKGROUND ART

An optical fiber sensor is a generic term for a system and a measurement technique for sensing a change in physical quantity such as temperature or distortion in association with a change in light intensity, frequency, or phase by using an optical fiber as a sensor medium. One of the optical fiber sensors is an interferometer-type optical fiber sensor. The interferometer-type optical fiber sensor uses a unilateral optical path of a Mach-Zehnder interferometer as a sensor unit, and performs sensing by using a phenomenon in which an intensity of an interference signal changes due to a change in the optical path length of the sensor unit due to temperature or distortion.

In addition, a multipoint interferometer-type optical fiber sensor that includes a plurality of interferometer-type connected optical fiber sensors and separately detects signals of individual sensors has also been developed. The multipoint interferometer-type optical fiber sensor uses a time domain division multiplexing mode, a wavelength domain division multiplexing mode, or a coherence domain division multiplexing mode depending on a difference in the division multiplexing mode for a plurality of sensor signals. Especially, the coherence domain division multiplexing mode is characterized in that each sensor signal can be constantly monitored and multipoint connection of sensors can be achieved without using a special optical device such as a wavelength division optical coupler.

An outline of a multipoint interferometer-type optical fiber sensor based on the coherence domain division multiplexing mode is as described in Non Patent Literature 1. Specifically, low coherence light is injected into sensor units in which a plurality of Mach-Zehnder interferometers are connected, transmitted light is split, and signals are separately detected by light-reception Mach-Zehnder interferometers corresponding to individual sensor units. In this regard, differences in propagation delay time between optical paths of the plurality of interferometers used in the sensor units are designed to be different from each other, and differences in propagation delay time between optical paths of the light-reception interferometers are designed to be equal to differences in propagation delay time between optical paths of the interferometers of the corresponding sensor units.

Given that the number of sensor units is N (N is a natural number), that an amplitude of a complex electric field of light emitted from a low coherence light source is $E_0(t)$, and that an amplitude of a complex electric field of light transmitting through an i-th (i=1 to N) sensor unit is $E_i(t)$, a temporal average $\langle I_j(t) \rangle$ of a light intensity detected by a j-th (j=1 to N) light receiver is expressed by the following expression.

[Math. 1]

$$\langle I_j(t) \rangle \propto \int \left| E_0(t) + E_0(t - \tau_j) + \sum_{i=1}^{N} [E_i(t) + E_i(t - \tau_j)] \right|^2 dt \tag{1}$$

Here, $\tau_j$ is a difference in propagation delay time between optical paths of a j-th interferometer of the light receiver.

Given that a propagation delay time of the i-th sensor unit and an optical phase change due to a change in temperature or distortion are respectively $\tau_i$ and $\Delta\theta_i$, $E_i(t)$ and $\langle I_j(t) \rangle$ can be described as the following expressions.

[Math. 2]

$$E_i(t) = e^{j\Delta\theta_i} a_i E_0(t - \tau_i) \tag{2}$$

[Math. 3]

$$\langle I_j(t) \rangle \propto \int \left| E_0(t) + E_0(t - \tau_j) + \right.$$

$$\left. \sum_{i=1}^{N} e^{j\Delta\theta_i} a_i [E_0(t - \tau_i) + E_0(t - \tau_i - \tau_j)] \right|^2 dt \propto 2 \left( \sum_{i=1}^{N} a_i + 1 \right) \Gamma(0) +$$

$$\Gamma(\tau_j) + \sum_{i=1}^{N} a_i [2\Gamma(\tau_i) + \Gamma(\tau_i - \tau_j) + \Gamma(\tau_i + \tau_j)] \cos\Delta\theta_i \tag{3}$$

Here, $a_i$ is a constant related to an amplitude of light transmitting through the i-th sensor unit. $\Gamma(\tau)$ is an autocorrelation function of $E_0(t)$ and is defined by the following expression.

[Math. 4]

$$\Gamma(\tau) \equiv \frac{1}{\sqrt{\int |E_0(t)|^2 dt} \sqrt{\int |E_0(t + \tau)|^2 dt}} \int E_0(t) E_0^*(t + \tau) dt \tag{4}$$

Here, the superscript * is a complex conjugate.

when a coherence time of $E_0(t)$ is sufficiently short with respect to an available value of $\tau$, $\Gamma(t)$ can be regarded as the following expression.

[Math. 5]

$$\Gamma(\tau) = \begin{cases} 1 \ (\tau = 0) \\ 0 \ (\tau \neq 0) \end{cases} \tag{5}$$

Given that the expression (5) is substituted into the expression (3), in a region of $\tau > 0$, $\langle I_j(t) \rangle$ is expressed by the following expression.

[Math. 6]

$$\langle I_j(t) \rangle \propto \begin{cases} 2 \left( \sum_{i=1}^{N} a_i + 1 \right) \Gamma(0) + a_i \cos\Delta\theta_j \ (\tau_j = \tau_i) \\ 2 \left( \sum_{i=1}^{N} a_i + 1 \right) \Gamma(0) \quad (\tau_j = \tau_i) \end{cases} \tag{6}$$

Therefore, the temporal average $\langle I_j(t) \rangle$ of the light intensity detected by the j-th light receiver changes depending only on the optical phase change $\Delta\theta_j$ in the sensor unit whose difference in propagation delay time matches with that of the interferometer. That is, the signals of the individual sensor units can be separately detected for each light receiver. $\Delta\theta_j$ is in a relationship of the following expression with respect to a temperature change $\Delta T_j$ and a distortion change $\Delta\varepsilon_j$ in the j-th sensor unit.

[Math. 7]

$$\Delta\theta_j = C_T\Delta T_j + C_\varepsilon\Delta\varepsilon_j \qquad (7)$$

Here, $C_T$ and $C_\varepsilon$ are respectively proportional constants with respect to the temperature change and the distortion change. By obtaining the proportional constants $C_T$ and $C_\varepsilon$ in advance and substituting the expression (7) into the expression (6), it is possible to measure a change in temperature and distortion of the corresponding sensor unit.

CITATION LIST

Non Patent Literature

Non Patent Literature 1: J. L. Brooks, R. H. Wentworth, R. C. Youngquist, M. Tur, B. Y. Kim, and H. J. Shaw, "Coherence Multiplexing of Fiber-Optic Interferometric Sensors," J. Lightw. Technol., Vol. LT-3, No. 5, pp. 1062-1072, 1985.

SUMMARY OF INVENTION

Technical Problem

In the multipoint interferometer-type optical fiber sensor in the related art based on the coherence domain division multiplexing mode, it is necessary to provide the Mach-Zehnder interferometers and the light receivers, for the light receiving unit, each of which is as many as sensor units. As a result, there is a problem that a configuration of the device becomes complicated and costly due to multipoint connection of sensor units. In addition, it is necessary to design the configuration such that the differences in propagation delay time between optical paths of the interferometers prepared in the light receiving unit match with the differences in propagation delay time between optical paths of the interferometers of the corresponding sensor unit, and this is not necessarily easy.

The present disclosure has been made in view of the above circumstances, and an object of the present disclosure is to provide a technique capable of realizing multipoint connection of sensors without complicating a device configuration and a design in a multipoint interferometer-type optical fiber sensor based on a coherence domain division multiplexing mode.

Solution to Problem

According to the present disclosure, there is provided an optical fiber sensing device including:
- a light source for outputting continuous light;
- an optical coupler for branching the continuous light;
- a reference interferometer, into which continuous light branched by the optical coupler is injected, for producing a predetermined difference $\tau_{ref}$ in propagation delay time in the continuous light;

- a sensor interferometer, into which continuous light branched by the optical coupler is injected, including a plurality of connected Mach-Zehnder interferometers for producing, in the continuous light, differences in propagation delay time that correspond to integer multiples of the predetermined difference $\tau_{ref}$ in propagation delay time and are different from each other, the Mach-Zehnder interferometers having unilateral optical paths functioning as sensor units; and
- a signal processing unit for performing signal processing by using a light reception signal I(t) which is obtained by receiving light transmitting through the sensor interferometer and a reference signal $I_{ref-1}(t)$ which is obtained by receiving light transmitting through the reference interferometer,
  in which the signal processing unit
  calculates a reference signal $I_{ref-j}(t)$ corresponding to a j-th (j is a natural number) sensor unit of the sensor units by using the reference signal $I_{ref-1}(t)$,
  calculates a cross-correlation $R_j$ between the light reception signal I(t) and the reference signal $I_{ref-j}(t)$, and
  detects a change in the j-th sensor unit by using a change in the cross-correlation $R_j$.

According to the present disclosure, there is provided an optical fiber sensing method including:
- branching continuous light from a light source;
- injecting the branched continuous light into a reference interferometer producing a predetermined difference $\tau_{ref}$ in propagation delay time in the continuous light;
- injecting the branched continuous light into a sensor interferometer, including a plurality of connected Mach-Zehnder interferometers, producing, in the continuous light, differences in propagation delay time that correspond to integer multiples of the predetermined difference $\tau_{ref}$ in propagation delay time and are different from each other, the Mach-Zehnder interferometers having unilateral optical paths functioning as sensor units; and
- detecting, by a signal processing unit, a change in the sensor units by using a light reception signal I(t) which is obtained by receiving light transmitting through the sensor interferometer and a reference signal $I_{ref-1}(t)$ which is obtained by receiving light transmitting through the reference interferometer,
  in which the signal processing unit
  calculates a reference signal $I_{ref-j}(t)$ corresponding to a j-th sensor unit by using the reference signal $I_{ref-1}(t)$,
  calculates a cross-correlation $R_j$ between the light reception signal I(t) and the reference signal $I_{ref-j}(t)$, and
  detects a change in the j-th sensor unit by using a change in the cross-correlation $R_j$.

Advantageous Effects of Invention

According to the present disclosure, it is practical to realize multipoint connection of sensor units without using an interferometer on a light receiving side. Thus, multipoint sensing can be performed with a single device configuration regardless of the number of sensor units. Therefore, the present disclosure can realize multipoint connection of sensors without complicating a device configuration and a design in a multipoint interferometer-type optical fiber sensor based on a coherence domain division multiplexing mode.

BRIEF DESCRIPTION OF DRAWINGS

FIG. 3 is a flowchart illustrating an implementation procedure according to Embodiments 1 and 2 of the present disclosure.

DESCRIPTION OF EMBODIMENTS

Figure 1:
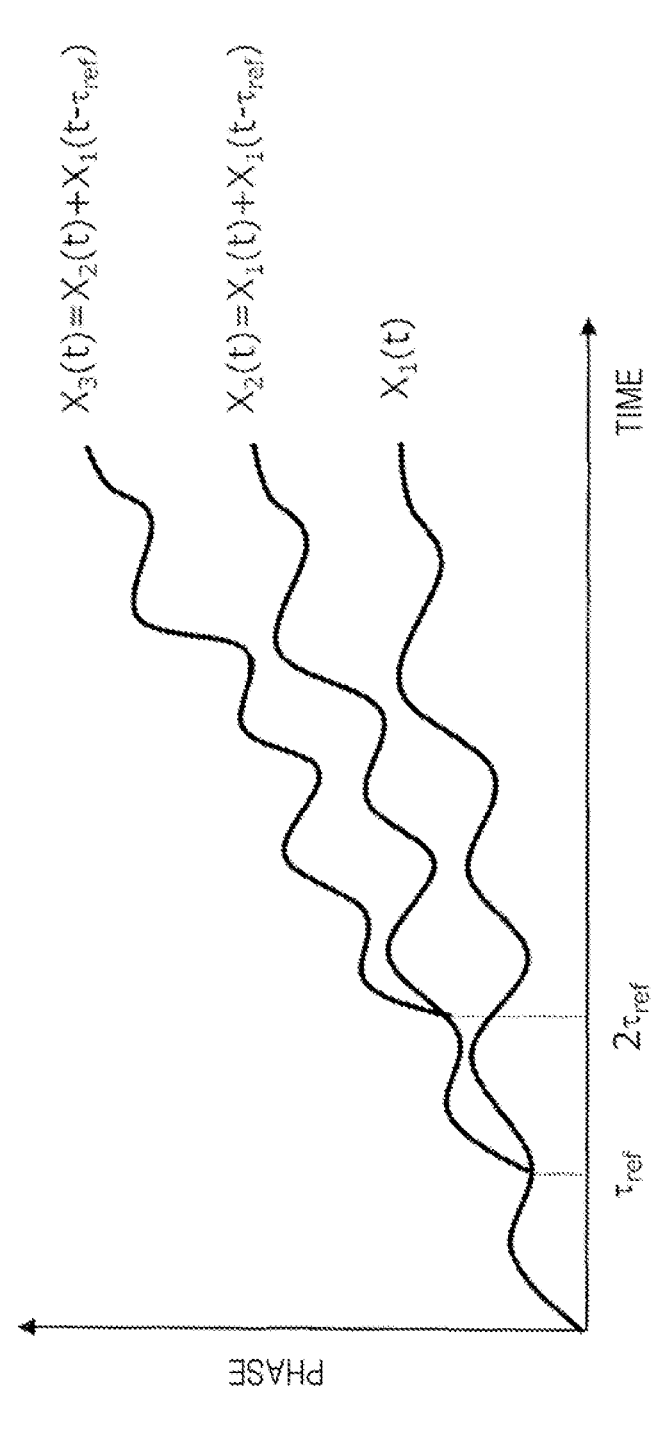
FIG. 1 is a conceptual diagram of calculation of a phase $X_{Mj}(t)$ of a reference signal in the present disclosure.

Hereinafter, embodiments of the present disclosure will be described in detail with reference to the drawings. Note that the present disclosure is not limited to the embodiments to be described below. These embodiments are merely examples, and the present disclosure can be implemented in forms in which various modifications and improvements can be performed based on knowledge of those skilled in the art. Note that components having the same reference numerals in the present specification and the drawings indicate the same components.

In the present disclosure, an optical signal transmitted through an interferometer of a sensor unit is received on a light receiving side without using an interferometer. Specifically, in an optical fiber sensing device according to the present disclosure, a reference interferometer, which transmits through an optical path different from an optical path of an interferometer of a sensor unit, is separately prepared, and a signal of each sensor unit before a change in temperature and distortion is generated in a pseudo manner by signal processing using a signal acquired from the reference interferometer. In the present disclosure, the signal generated in a pseudo manner is referred to as a reference signal. The optical fiber sensing device according to the present disclosure realizes a multipoint interferometer-type optical fiber sensor, without complicating a device configuration, by calculating a cross-correlation between the reference signal and a light reception signal acquired from the interferometer of the sensor unit.

When an interferometer is not used for the light receiving unit, a light reception signal $I(t)$ acquired in regard to an optical path transmitting through N (N is a natural number) sensor units is represented by the following expression.

[Math. 8]

$$I(t) \propto \left| E_0(t) + \sum_{i=1}^{N} E_i(t) \right|^2 \tag{8}$$

Here, $E_0(t)$ is an amplitude of a complex electric field of continuous light before injection into the N sensor units, and $E_i(t)$ is an amplitude of a complex electric field of light transmitting through an i-th (i=1 to N) sensor unit. In the present embodiment, an example in which continuous light from a light source is injected into the N sensor units will be described.

Given that the expression (2) is substituted into the expression (8), the light reception signal $I(t)$ is expressed by the following expression.

[Math. 9]

$$I(t) \propto \left| E_0(t) + \sum_{i=1}^{N} e^{j\Delta\theta_i} a_i E_0(t - \tau_i) \right|^2 \propto \sum_{i=1}^{N} a_i \cos[\theta(t) - \theta(t - \tau_i) - \Delta\theta_i] \tag{9}$$

Here, $\tau_i$ is a propagation delay time in the i-th sensor unit, $\Delta\theta_i$ is an optical phase change in the i-th sensor unit, and $a_i$ is a constant related to an amplitude of the light transmitting through the i-th sensor unit.

Note that, here, $\theta(t)$ is a phase of the continuous light from the light source and a description of a DC component is omitted in a second row of the expression (9). In addition, it is assumed that an intensity of light which transmits through each sensor unit is sufficiently weak ($a_i \ll 1$) in comparison with an intensity of light which does not transmit through the sensor unit and that interference components between the light transmitting through the sensor units are negligible.

On the other hand, a reference signal $I_{ref-1}(t)$ obtained from light transmitting through the reference interferometer is expressed by the following expression.

[Math. 10]

$$I_{ref-1}(t) \propto |E_0(t) + E_0(t - \tau_{ref})|^2 \propto \cos[\theta(t) - \theta(t - \tau_{ref})] \tag{10}$$

Here, $\tau_{ref}$ is a difference in propagation delay time between optical paths of the reference interferometer.

Next, by using $I_{ref-1}(t)$, a reference signal before a change in temperature and distortion of a j-th sensor unit is generated in a pseudo manner by numerical calculation. Assuming that a delay time $\tau_j$ given to the optical path of the j-th sensor unit is designed to satisfy $\tau_j = Mj\tau_{ref}$ ($M_j$ is a natural number), it is only necessary to generate a cosine wave signal having $\theta(t) - \theta(t - M_j\tau_{ref})$ as a phase component. Here, a phase $X_1(t)$ in regard to $M_j = 1$ and a phase $X_{Mj}(t)$ in regard to $M_j$ are defined as the following expressions.

[Math. 11]

$$X_1(t) \equiv \theta(t) - \tau(t - \tau_{ref}) \tag{11}$$

[Math. 12]

$$X_{M_j}(t) \equiv \theta(t) - \theta(t - M_j\tau_{ref}) \tag{12}$$

$X_{Mj}(t)$ can be calculated by the following expression using $X_1(t)$.

[Math. 13]

$$X_{M_j}(t) = \begin{cases} X_1(t) & (M_j = 1) \\ X_1(t) + \sum_{k=1}^{M_j-1} X_1(t - k\tau_{ref}) & (M_j > 1) \end{cases} \tag{13}$$

FIG. 1 is an image of calculation of $X_{Mj}(t)$ by the expression (13) on condition of $M_j > 1$. $X_{Mj}(t)$ is calculated by summing up $M_j$ waveforms obtained by shifting $X_1(t)$ by $\tau_{ref}$ on a time axis. By using $X_{Mj}(t)$, a pseudo reference signal $I_{ref-Mj}(t)$ in regard to the j-th sensor unit is generated by the following expression.

[Math. 14]

$$I_{ref-M_j}(t) = \cos X_{M_j}(t) = \cos[\theta(t) - \theta(t - M_j\tau_{ref})] \tag{14}$$

Next, a cross-correlation $R_{Mj}$ between cosine waves of $I(t)$ and $I_{ref-Mj}(t)$ is calculated. $R_{Mj}$ is calculated by the following expression.

[Math. 15]

$$(15)$$

$$R_{M_j} =$$

$$\int I(t)I_{ref-M_j}(t)dt = \frac{1}{2}\sum_{i=1}^{N} a_i \int \{\cos[\theta(t-\tau_i) - \theta(t-M_j\tau_{ref}) + \Delta\theta_i] +$$

$$\cos[2\theta(t) - \theta(t-\tau_i) - \theta(t-M_j\tau_{ref}) - \Delta\theta_i]\}dt =$$

$$\frac{1}{2}\sum_{i=1}^{N} a_i \int \cos[\theta(t-\tau_i) - \theta(t-M_j\tau_{ref}) + \Delta\theta_i]dt$$

Here, assuming that a coherence time of the continuous light from the light source is sufficiently shorter than $\tau_{ref}$ and the propagation delay times of the plurality of sensor units do not overlap each other, the following expression holds.

[Math. 16]

$$\int \cos[\theta(t-\tau_i) - \theta(t-M_j\tau_{ref}) + \Delta\theta_i]dt \propto \begin{cases} \cos\Delta\theta_j & (\tau_i = \tau_j) \\ 0 & (\tau_i \neq \tau_j) \end{cases} \quad (16)$$

Given that the expression (16) is substituted into the expression (15), $R_{Mj}$ is as follows.

[Math. 17]

$$R_{M_j} \propto \cos\Delta\theta_j \quad (17)$$

Therefore, a magnitude of the cross-correlation $R_{Mj}$ calculated in regard to $M_j$ satisfying $\tau_j = M_j\tau_{ref}$ changes depending on a change in temperature, distortion, and the like of the j-th sensor unit. Thereby, by monitoring a change in $R_{Mj}$, a change in temperature and distortion of the j-th sensor unit can be sensed. Similarly, a change in temperature and distortion of a certain i-th sensor unit, other than the j-th sensor unit, can be also sensed by monitoring a cross-correlation $R_{Mi}$ calculated in regard to $M_i$ satisfying $\tau_i = M_i\tau_{ref}$.

Effects of Present Disclosure

By using the present disclosure, it is practical to realize multipoint connection of the sensor units without adding an interferometer or a light receiver of the light receiving unit in the multipoint interferometer-type optical fiber sensor. In addition, in the related art, it is necessary to design the configuration such that the differences in propagation delay time between the optical paths are equal to each other in the interferometer of the sensor unit and the interferometer of the light receiving unit. On the other hand, by using the present disclosure, it is not necessary to provide the interferometer of the light receiving unit. Therefore, a design of the light receiving unit can be simplified. Thereby, multipoint sensing can be performed with a single device configuration regardless of the number of sensor units. Therefore, optical fiber sensing can be realized with lower cost and higher expandability than those of the related art.

Embodiments of the present disclosure will be described with reference to the accompanying drawings. Here, two types of embodiments having different configurations of the sensor unit will be described.

Embodiment 1

Figure 2:
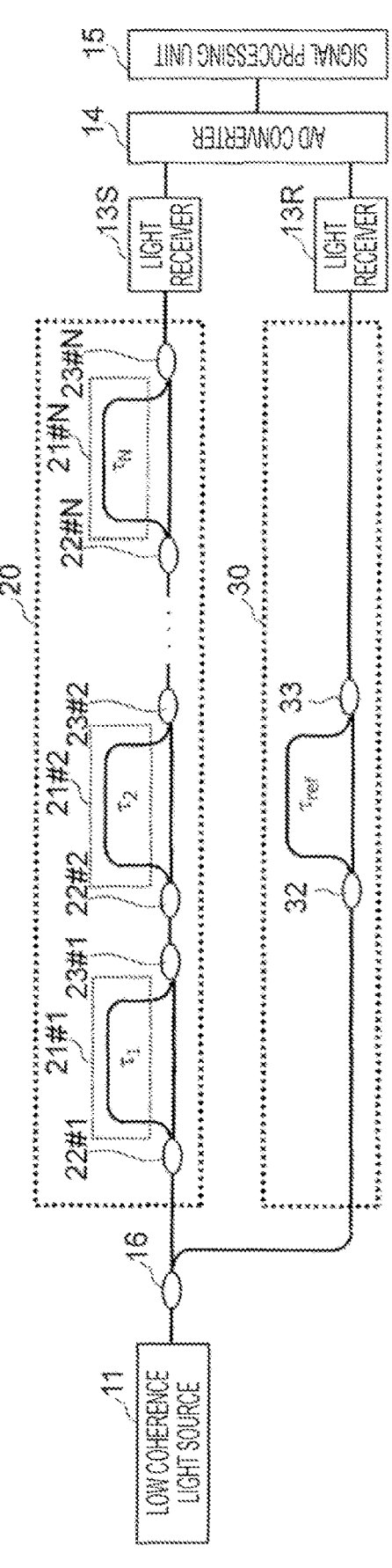
FIG. 2 is a block diagram illustrating a device configuration according to Embodiment 1 of the present disclosure.

FIG. 2 is a block diagram illustrating a device configuration according to the present embodiment. A low coherence light source 11 is used as a light source, and continuous light output from the low coherence light source 11 is branched at an optical coupler 16 and is injected into a sensor interferometer 20 and a reference interferometer 30. The sensor interferometer 20 includes N sensor units 21 #1 to 21 #N. A light receiver 13S receives light from the sensor interferometer 20. A light receiver 13R receives light from the reference interferometer 30.

The reference interferometer 30 is a Mach-Zehnder interferometer in which a difference in propagation delay time between optical paths is $\tau_{ref}$. The differences ti to IN in propagation delay time between optical paths of Mach-Zehnder interferometers of the sensor interferometer 20 are integar multiples of $\tau_{ref}$, and do not overlap each other in a plurality of Mach-Zehnder interferometers $(M_j \neq M_i (j \neq i))$. In addition, as the low coherence light source 11, a light source having a coherence time shorter than $\tau_{ref}$ is used.

In the present embodiment, the sensor interferometer 20 has a chain type configuration in which a plurality of Mach-Zehnder interferometers are connected in series with optical couplers 22 #1 to 22 #N and 23 #1 to 23 #N, and unilateral optical paths of the Mach-Zehnder interferometers of the sensor interferometer 20 individually corresponds to the sensor units 21 #1 to 21 #N.

FIG. 3 is a flowchart illustrating an implementation procedure in the present embodiment. The implementation procedure includes an optical interference signal acquisition step S11, a reference signal phase calculation step S12, a phase coupling step S13, a pseudo signal generation step S14, and a cross-correlation step S15. Note that, here, an example where sensing is performed in regard to the j-th sensor unit 21 #i of the plurality of sensor units 21 #1 to 21 #N will be described.

In the optical interference signal acquisition step S11, optical interference signals are individually acquired by using two types of optical interferometers: the sensor interferometer 20 and the reference interferometer 30. Specifically, continuous light transmitted through the sensor interferometer 20 and continuous light transmitted through the reference interferometer 30 are respectively received by individual light receivers 13S and 13R, and are converted into electric signals. The light reception signals that are the electric signals obtained by the conversion are individually converted into digital signals by an A/D converter 14, and are transmitted to a signal processing unit 15.

The signal processing unit 15 calculates optical interference signals of the sensor interferometer 20 and the reference interferometer 30 by using the digital signals from the A/D converter 14. The digital signal obtained from the light receiver 13S is a light reception signal I(t), and the digital signal obtained from the light receiver 13R is a light reception signal $I_{ref-1}(t)$.

Next, in the reference signal phase calculation step S12, the signal processing unit 15 calculates a phase $X_1(t)$ by using the light reception signal $I_{ref-1}(t)$ obtained in regard to the reference interferometer 30 of the two types of optical interference signals acquired in the optical interference signal acquisition step S11. $X_1(t)$ can be calculated by the following expression using the signal $I_{ref-1}(t)$ obtained for the reference interferometer 30.

[Math. 18]

$$X_1(t) = \tan^{-1} \frac{H[I_{ref-1}(t)]}{I_{ref-1}(t)} \tag{18}$$

Here, $H[I_{ref-1}(t)]$ is a Hilbert transform of $I_{ref-1}(t)$, and $H[I_{ref-1}(t)]$ is expressed as the following expression where $I_{ref-1}(t)$ is expressed as the expression (10).

[Math. 19]

$$H[I_{ref-1}(t)] \propto \sin[\theta(t) - \theta(t - \tau_{ref})] \tag{19}$$

Next, in the phase coupling step S13, $X_{Mj}(t)$ is obtained by the expression (13) using $X_1(t)$. Here, $M_j$ is a natural number that satisfies $\tau_j = M_j \tau_{ref}$ where the difference in propagation delay time between optical paths of the interferometers of the j-th sensor unit 21 #j is $\tau_j$.

Next, in the pseudo signal generation step S14, a pseudo signal $I_{ref-Mj}(t)$ in regard to the j-th sensor unit 21 #j is calculated by the expression (14).

Finally, in the cross-correlation step S15, a cross-correlation $R_{Mj}$ between the optical interference signal I(t) and the pseudo signal $I_{ref-Mj}(t)$, which are acquired in regard to the sensor interferometer 20, is calculated. By monitoring a magnitude of the calculated $R_{Mj}$, a change in temperature and distortion of the j-th sensor unit 21 #j is detected.

Embodiment 2

Figure 4:
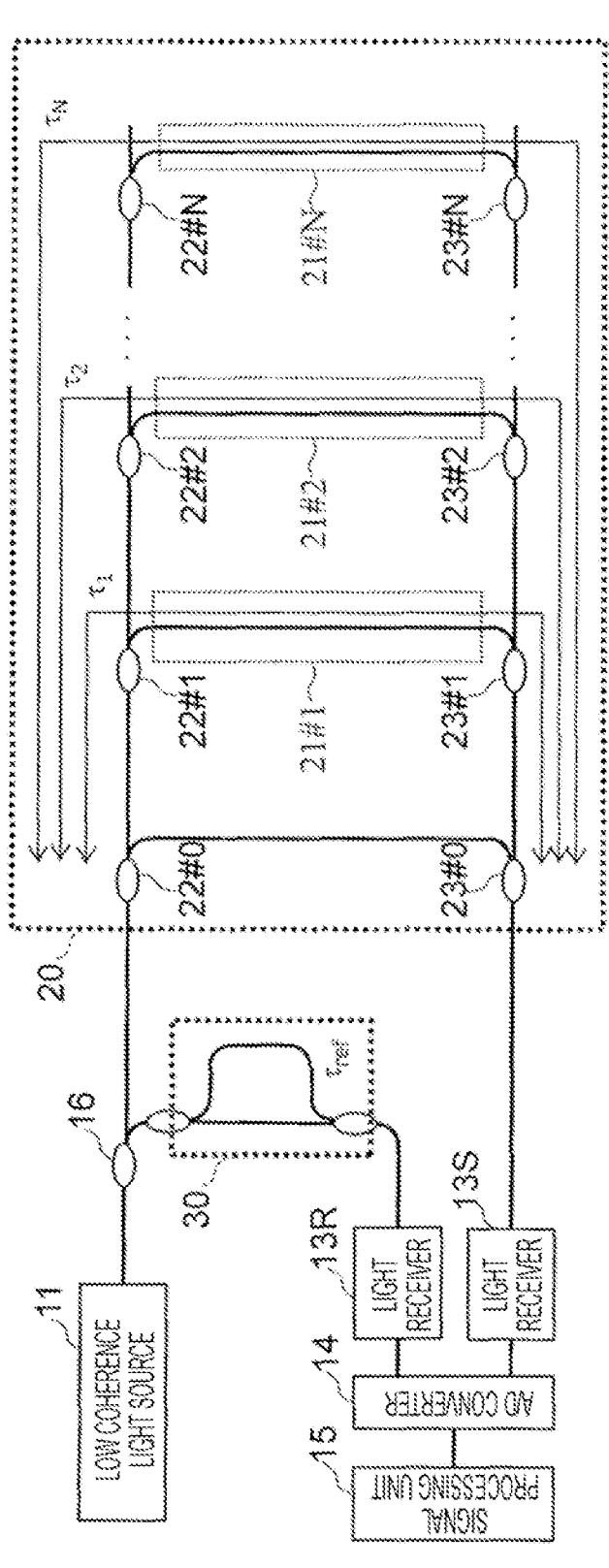
FIG. 4 is a block diagram illustrating a device configuration according to Embodiment 2 of the present disclosure.

In the present embodiment, an implementation procedure is the same as that of Embodiment 1, and a device configuration for use is different from that of Embodiment 1. FIG. 4 is a block diagram illustrating a device configuration according to the present embodiment. A low coherence light source 11 is used as a light source, and continuous light output from the low coherence light source 11 is branched at an optical coupler 16 and is injected into a sensor interferometer 20 and a reference interferometer 30.

The reference interferometer 30 is a Mach-Zehnder interferometer in which a difference in propagation delay time between optical paths is $\tau_{ref}$. The sensor interferometer 20 includes a plurality of sensor units 21 connected in parallel, and a propagation delay time $\tau$ of continuous light transmitting through the sensor interferometer 20 is different for each sensor unit 21. In the present embodiment, the sensor interferometer 20 has a configuration in which the optical fibers are connected in a ladder shape with the optical couplers 22 #1 to 22 #N and 23 #1 to 23 #N, and optical paths of stages of the ladder shape individually correspond to the sensor units 21 #1 to 21 #N.

In the sensor interferometer 20 of FIG. 4, the differences in propagation delay time during which light emitted from the optical coupler 22 #0 at an upper left end individually transmits through the sensor units 21 #1 to 21 #N and is injected into the optical coupler 23 #0 at a lower left end are integral multiples of $\tau_{ref}$, and do not overlap each other in the plurality of sensor units 21 ($M_j \neq M_i$ ($j \neq i$)). Continuous light transmitted through the sensor interferometer 20 and continuous light transmitted through the reference interferometer 30 are respectively received by individual light receivers 13S and 13R, and are converted into electric signals. The light reception signals that are the electric signals obtained by the conversion are individually converted into digital signals by an A/D converter 14, and are transmitted to a signal processing unit 15. Note that, as the low coherence light source 11 used in the device configuration, a light source having a coherence time shorter than $\tau_{ref}$ is used.

The other implementation procedure is performed in accordance with the flowchart of FIG. 3 similarly to Embodiment 1.

The signal processing unit 15 of the present disclosure can also be implemented on a computer and in a program, and the program can be recorded on a recording medium or be provided through a network.

INDUSTRIAL APPLICABILITY

The present disclosure can be applied to information and communication industries.

REFERENCE SIGNS LIST

11 Low coherence light source
12 High coherence light source
13 Light receiver
14 A/D converter
15 Signal processing unit
16, 22 #0 to 22 #N, 23 #0 to 23 #N, 32, 33 Optical coupler
20 Sensor interferometer
30 Reference interferometer

The invention claimed is:

1. An optical fiber sensing device comprising:
a light source for outputting continuous light;
an optical coupler for branching the continuous light;
a reference interferometer, into which continuous light branched by the optical coupler is injected, for producing a predetermined difference $\tau_{ref}$ in propagation delay time in the continuous light;
a sensor interferometer, into which continuous light branched by the optical coupler is injected, including a plurality of connected Mach-Zehnder interferometers for producing, in the continuous light, differences in propagation delay time that correspond to integer multiples of the predetermined difference $\tau_{ref}$ in propagation delay time and are different from each other, the Mach-Zehnder interferometers having unilateral optical paths functioning as sensor units; and
a signal processing unit for performing signal processing by using a light reception signal I(t) which is obtained by receiving light transmitting through the sensor interferometer and a reference signal $I_{ref-1}$ ($t$) which is obtained by receiving light transmitting through the reference interferometer,
wherein the signal processing unit
calculates a reference signal $I_{ref-j}$ (t) corresponding to a j-th (j is a natural number) sensor unit of the sensor units by using the reference signal $I_{ref-1}$ ($t$),
calculates a cross-correlation $R_j$ between the light reception signal I(t) and the reference signal $I_{ref-j}$ (t), and
detects a change in the j-th sensor unit by using a change in the cross-correlation $R_j$.

2. The optical fiber sensing device according to claim 1, wherein the signal processing unit
calculates a phase $X_1$ ($t$) of the continuous light at the predetermined difference $\tau_{ref}$ in propagation delay time by using the reference signal $I_{ref-1}$ ($t$),
calculates, on condition that the difference in propagation delay time of the j-th sensor unit is Mj times $\tau_{ref}$, a phase $X_{Mj}$ (t) corresponding to the j-th sensor unit by summing up $M_j$ waveforms obtained by shifting $X_1$ ($t$) by τref, and calculates the reference signal $I_{ref\text{-}j}$ (t) corresponding to the j-th sensor unit by using the phase $X_{Mj}$ (t).

3. The optical fiber sensing device according to claim 2, wherein the signal processing unit calculates, as the reference signal $I_{ref\text{-}j}$ (t), a cosine wave having the phase $X_{Mj}$ (t) as a phase component, and calculates the cross-correlation $R_j$ between the light reception signal I(t) and the reference signal $I_{ref\text{-}j}$ (t) by using the cosine wave.

4. The optical fiber sensing device according to claim 1, wherein the predetermined difference $\tau_{ref}$ in propagation delay time of the reference interferometer is longer than a coherence time of the continuous light.

5. The optical fiber sensing device according to claim 1, wherein the sensor interferometer includes a plurality of Mach-Zehnder interferometers connected in series, the sensor units are unilateral optical paths in the Mach-Zehnder interferometers, and differences in propagation delay time of the sensor units included in the plurality of Mach-Zehnder interferometers are different from each other.

6. The optical fiber sensing device according to claim 1, wherein the sensor interferometer includes a plurality of sensor units connected in parallel, and a propagation delay time of the continuous light transmitting through the sensor interferometer is different for each of the sensor units.

7. The optical fiber sensing device according to claim 1, wherein the change in the sensor unit is a change in temperature or distortion of the j-th sensor unit.

8. An optical fiber sensing method comprising:

branching continuous light from a light source;

injecting the branched continuous light into a reference interferometer producing a predetermined difference $\tau_{ref}$ in propagation delay time in the continuous light;

injecting the branched continuous light into a sensor interferometer, including a plurality of connected Mach-Zehnder interferometers, producing, in the continuous light, differences in propagation delay time that correspond to integer multiples of the predetermined difference $\tau_{ref}$ in propagation delay time and are different from each other, the Mach-Zehnder interferometers having unilateral optical paths functioning as sensor units; and detecting, by a signal processing unit, a change in the sensor units by using a light reception signal I(t) which is obtained by receiving light transmitting through the sensor interferometer and a reference signal $I_{ref\text{-}1}$ ($t$) which is obtained by receiving light transmitting through the reference interferometer, wherein the signal processing unit calculates a reference signal $I_{ref\text{-}j}$ (t) corresponding to a j-th sensor unit by using the reference signal $I_{ref\text{-}1}$ ($t$), calculates a cross-correlation $R_j$ between the light reception signal I(t) and the reference signal $I_{ref\text{-}j}$ (t), and detects a change in the j-th sensor unit by using a change in the cross-correlation $R_j$.

* * * * *